US009152112B2

(12) United States Patent
Maeda et al.

(10) Patent No.: US 9,152,112 B2
(45) Date of Patent: Oct. 6, 2015

(54) IMAGE FORMING SYSTEM AND IMAGE FORMING APPARATUS WITH IMPROVED ERROR REPORTING STATUS

(75) Inventors: Tetsuya Maeda, Osaka (JP); Toru Yasui, Osaka (JP); Kensaku Sugimoto, Osaka (JP)

(73) Assignee: Kyocera Document Solutions Inc. (JP)

( * ) Notice: Subject to any disclaimer, the term of this patent is extended or adjusted under 35 U.S.C. 154(b) by 186 days.

(21) Appl. No.: 13/235,910

(22) Filed: Sep. 19, 2011

(65) Prior Publication Data

US 2012/0092709 A1 Apr. 19, 2012

(30) Foreign Application Priority Data

Oct. 15, 2010 (JP) ................................ 2010-233076

(51) Int. Cl.
*G06F 3/12* (2006.01)
*G06F 15/16* (2006.01)
*G03G 15/00* (2006.01)

(52) U.S. Cl.
CPC .......... *G03G 15/5016* (2013.01); *G03G 15/502* (2013.01); *G03G 15/5083* (2013.01); *G03G 15/5087* (2013.01); *G03G 15/5091* (2013.01); *G03G 2215/00109* (2013.01)

(58) Field of Classification Search
CPC ............ G03G 15/5016; G03G 15/502; G03G 2215/00109; G06F 3/1205; G06F 3/1207; G06F 3/1237; G06F 3/1259; G06F 3/1285; G06F 3/1288; H04N 1/00209; H04N 2201/0039; H04N 2201/3218; H04N 2201/3219; H04N 2201/3221
USPC ........................................ 358/1.15; 709/217
See application file for complete search history.

(56) References Cited

U.S. PATENT DOCUMENTS

| | | | | |
|---|---|---|---|---|
| 6,236,994 | B1 * | 5/2001 | Swartz et al. | 707/999.102 |
| 7,052,190 | B2 * | 5/2006 | Ishii | 358/1.15 |
| 2010/0007916 | A1 * | 1/2010 | Ikeda | 358/1.15 |
| 2010/0238493 | A1 * | 9/2010 | Sako et al. | 358/1.15 |
| 2010/0290081 | A1 * | 11/2010 | Uchida | 358/1.15 |
| 2010/0302590 | A1 * | 12/2010 | Matsubayashi et al. | 358/1.15 |
| 2011/0235113 | A1 * | 9/2011 | Ohara | 358/1.15 |

FOREIGN PATENT DOCUMENTS

| | | |
|---|---|---|
| JP | H10-28196 | 1/1998 |

* cited by examiner

*Primary Examiner* — Benny Q Tieu
*Assistant Examiner* — Juan M Guillermety

(57) ABSTRACT

In an image forming apparatus, a page data generation unit is configured to generate page data of a job list screen that includes a link to the page data of a detailed information screen on an uncompleted job. The detailed information screen is a screen that displays the status of one job determined by a job status management unit. The page data generation is further configured to (A) generate the page data of a job request screen, and (B) if the job receipt unit receives a job that is requested based on the page data of the job request screen, generate the page data of a receipt-confirmation screen that includes a link to the page data of the detailed information screen on the received job.

9 Claims, 6 Drawing Sheets

IMAGE FORMING SYSTEM AND IMAGE FORMING APPARATUS WITH IMPROVED ERROR REPORTING STATUS

CROSS-REFERENCE TO RELATED APPLICATION

This application relates to and claims priority rights from a Japanese Patent Application: No. 2010-233076, filed on Oct. 15, 2010, the entire disclosures of which are hereby incorporated by reference herein.

BACKGROUND OF THE INVENTION

1. Field of the Invention

This invention relates to image forming systems and image forming apparatuses.

2. Description of the Related Art

Recently, many image forming apparatuses such as printer and multifunction peripheral have network function, and receive a print job, a facsimile job, an image-scan job, and so on via a network from a terminal apparatus such as personal computer, and perform the received job.

In particular, an image forming apparatus has web server function, and transmits screen data described in HTML (Hypertext Markup Language) to a terminal apparatus corresponding to a request received from the terminal apparatus. The terminal apparatus displays a screen based on the screen data by a web browser. For instance, a device setting screen, a job history screen, and so on are displayed in this manner.

An image forming apparatus has an operation panel, and displays a list of current completed and uncompleted jobs on the operation panel if the operation panel receives a predetermined user operation.

SUMMARY OF THE INVENTION

For displaying detailed information on a current status of a job, in general, a user firstly chooses an item in a menu screen for displaying a job list, and secondly chooses a job in the job list for displaying the detailed information on the current status of the job. In such manner, the user has to operate at least twice in order to display detailed information on a current status of a job.

Therefore, after a user performs an operation for a job request, in order to display detailed information on a status of the requested job, the user has to return to the menu screen, and then operates at least twice as mentioned above.

This invention has been conceived in order to solve this problem, and provide an image forming system and an image forming apparatus capable of displaying detailed information on a status of a job with simple user operation after a user requested the job.

The present invention solves this subject as follows.

An image forming system according to an aspect of the present invention has: an image forming apparatus configured to connect to a network; and a terminal apparatus configured to connect to the network. The terminal apparatus has a web browser that causes a display device to display a screen based on page data. The image forming apparatus has: (a) a web server configured to transmit the page data corresponding to a request received from the web browser, (b) a job receipt unit configured to receive a job, (c) a job status management unit configured to determine a status of the job, and (d) a page data generation unit configured to generate the page data of a job list screen that includes a link to the page data of a detailed information screen on an uncompleted job and transmit the page data of the job list screen to the web browser by using the web server. The detailed information screen is a screen that displays the status of the job determined by the job status management unit. The page data generation unit is further configured to (A) generate page data of a job request screen corresponding to a request received from the web browser and transmit the page data of the job request screen to the web browser by using the web server; and (B) if the job receipt unit receives a job that is requested based on the page data of the job request screen, generate page data of a receipt-confirmation screen on the received job and transmit the page data of the receipt-confirmation screen that includes a link to page data of the detailed information screen on the received job, to the web browser by using the web server.

A user can make the detailed information screen immediately displayed after the job receipt by following the link in the receipt-confirmation screen. Therefore, detailed information on a status of a job is displayed with simple user operation after the user requests the job.

An image forming apparatus that connects to a network according to an aspect of the present invention has (a) a job receipt unit configured to receive a job; (b) a job status management unit configured to determine a status of the job; and (c) a page data generation unit configured to generate page data of a job list screen that includes a link to the page data of a detailed information screen on an uncompleted job. The detailed information screen is a screen that displays the status of the job determined by the job status management unit. The page data generation unit is further configured to (A) generate the page data of a job request screen, and (B) if the job receipt unit receives a job that is requested based on the page data of the job request screen, generate the page data of a receipt-confirmation screen that includes a link to the page data of the detailed information screen on the received job.

A user can make the detailed information screen immediately displayed after the job receipt by following the link in the receipt-confirmation screen. Therefore, detailed information on a status of a job is displayed with simple user operation after the user requests the job.

An image forming apparatus that connects to a network according to an aspect of the present invention has (a) a job receipt unit configured to receive a job; (b) a job status management unit configured to determine a status of the job; and (c) a page data generation unit configured to generate page data of an uncompleted-job list screen that includes a link to the page data of a detailed information screen on an uncompleted job. The detailed information screen is a screen that displays the status of the job determined by the job status management unit. The page data generation unit is further configured to (A) generate the page data of a job request screen, and (B) if the job receipt unit receives a job requested based on the page data of the job request screen, generate the page data of a receipt-confirmation screen that includes a link to the page data of the uncompleted-job list screen.

A user can make the uncompleted-job list screen displayed after the job receipt by following the link in the receipt-confirmation screen and make the detailed information screen immediately displayed by operating the uncompleted-job list screen. Therefore, detailed information on a status of a job is displayed with simple user operation after the user requests the job.

These and other objects, features and advantages of the present invention will become more apparent upon reading of the following detailed description along with the accompanied drawings.

DETAILED DESCRIPTION OF THE PREFERRED EMBODIMENT

Hereinafter, embodiments according to aspects of the present invention will be explained with reference to drawings.

Figure 1:
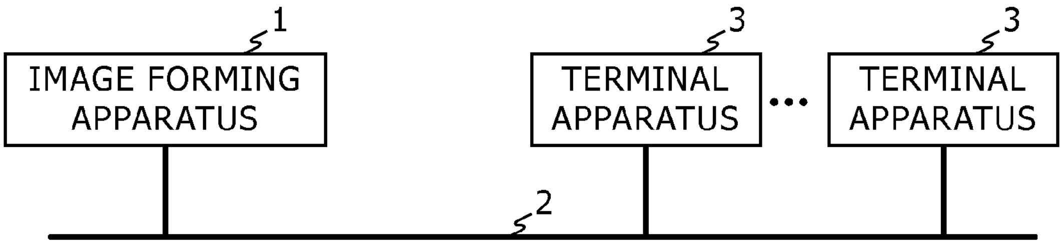
FIG. 1 shows a schematic diagram that indicates a configuration of an image forming system according to an embodiment of this invention.

FIG. 1 shows a schematic diagram that indicates a configuration of an image forming system according to an embodiment of this invention. In the system shown in FIG. 1, an image forming apparatus 1 is connected to a network 2, and a terminal apparatus 3 is also connected to the network 2. The image forming apparatus 1 is an apparatus such as printer machine, scanner machine, copier, or multifunction peripheral. The image forming apparatus 1 is shared by plural users, and each of the users can use the image forming apparatus 1 by directly operating an operation panel of the image forming apparatus 1 and by remotely operating the terminal apparatus 3.

Figure 2:
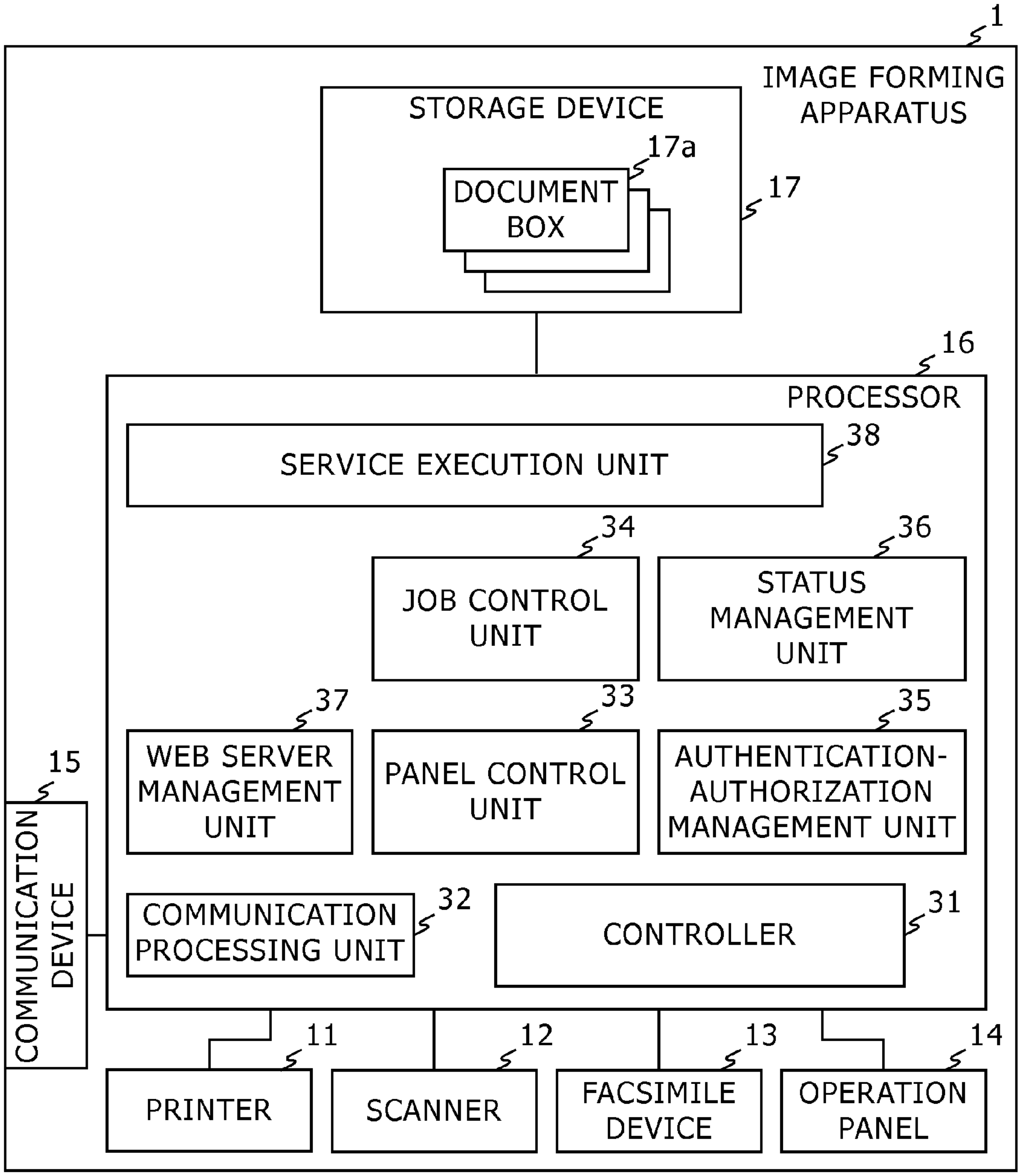
FIG. 2 shows a block diagram that indicates a configuration of the image forming apparatus in FIG. 1.

FIG. 2 shows a block diagram that indicates a configuration of the image forming apparatus 1 in FIG. 1.

The image forming apparatus 1 has a printer 11, a scanner 12, a facsimile device 13, an operation panel 14, a communication device 15, a processor 16, and a storage device 17.

The printer 11 is an internal device which performs printing a document image based on print data. The scanner 12 is an internal device which optically scans a document image from a document, and generates image data of the document image. The facsimile device 13 is an internal device which generates a facsimile signal from image data of a document image to be transmitted and transmits the facsimile signal, and receives a facsimile signal and converts it to image data.

The operation panel 14 is disposed on the case surface of the image forming apparatus 1, and has a display device which displays information to a user and an input device which receives user operation. For example, the display device includes a liquid crystal display, and the input device includes button switches, a touch panel, and so on. The button switches are hardware buttons, and the display device and the touch panel form software buttons. Hence, the operation panel 14 is a user interface of the image forming apparatus 1.

The communication device 15 is connected to the network 2, and performs data communication with other devices (e.g. the terminal apparatus 3) via the network 2 according to a predetermined communication protocol. For example, the communication device 15 is a network interface or a modem.

The processor 16 is a computer which has a CPU (Central Processing Unit), a ROM (Read Only Memory), and a RAM (Random Access Memory), and loads programs into the RAM from the ROM or an unshown memory device and executes the programs by the CPU to form some processing units.

After the image forming apparatus 1 starts, the processor 16 executes some programs as necessary. In this embodiment, the processor 16 forms processing units which include an unshown operating system, a controller 31, a communication processing unit 32, a panel control unit 33, a job control unit 34, an authentication-authorization management unit 35, a status management unit 36, a web server management unit 37, and a service execution unit 38.

The controller 31 is a processing unit which watches and controls internal devices such as the printer 11, the scanner 12, the facsimile device 13, and the operation panel 14. The controller 31 notifies the status management unit 36 of statuses of the internal devices.

The communication processing unit 32 is a processing unit which performs data communication by controlling the communication device 15. The communication processing unit 32 has a web server, and communicates with a web browser of the terminal apparatus 3 according to HTTP (Hypertext Transfer Protocol).

The panel control unit 33 is a processing unit which causes the operation panel 14 to display screens, detects a user operation to the operation panel 14, and performs a screen transition according to the user operation by using the controller 31.

The job control unit 34 is a processing unit which executes a job corresponding to a job request received by the service execution unit 38. The job control unit 34 operates the internal device corresponding to the type of the job (e.g. the printer 11) by using the controller 31.

The authentication-authorization management unit 35 performs user authentication and determines whether user login is allowed, and determines whether executing a job requested by a user is allowed or not according to authorization information. The authorization information includes information, regarding each user, on one or more job types of a user job allowed to be executed. In addition, the authentication-authorization management unit 35 determines attribution information (e.g. user name for display, email address) on a login user (i.e. a user allowed to login) as necessary. The attribution information on a user is associated with a user ID of the user, and the attribution information on the login user is determined from his/her user ID inputted when the user logged-in.

The status management unit 36 determines a current status of a job received by the service execution unit 38 from some information such as status information on the internal devices which the controller 31 provides.

The web server management unit 37 generates page data of a job list screen based on a job status of each job determined by the status management unit 36. The job list screen includes a link to page data of a detailed information screen on each uncompleted job. The web server management unit 37 is a page data generation unit and generates the page data described in HTML.

The detailed information screen is a screen which displays a status of one job determined by the status management unit 36. The web server management unit 37 generates and transmits page data of a job request screen. If the service execution unit 38 receives a job requested based on the page data of the job request screen, then the web server management unit 37 generates page data of a receipt-confirmation screen on the received job. In the page data of the receipt-confirmation screen, a link to the page data of the detailed information screen on the received job is described. A URL (Uniform Resource Locator) specified by this link is unique to the job, and assigned when the job is received.

In this embodiment, upon receiving a request from a web browser of the terminal apparatus 3 by the web server of the communication processing unit 32, the web server management unit 37 generates page data of a job request screen corresponding to the request and transmits the page data of the job request screen to the web browser by using the web server; and if the service execution unit 38 receives a job requested based on the page data of the job request screen, then the web server management unit 37 generates page data of a receipt-confirmation screen on the received job and transmits the page data of the receipt-confirmation screen to the web browser by using the web server. This page data of the receipt-confirmation screen includes to a link to page data of a detailed information screen on the received job.

The service execution unit 38 receives a job request (printing, copy, facsimile transmission, system setting change, etc.) based on either user operation to the operation panel 14 or a command transmitted from the terminal apparatus 3 via the network 2, and causes to execute a job corresponding to the job request. The service execution unit 38 causes the job control unit 24 to execute a job such as printing, copy or facsimile transmission. Therefore, the service execution unit 38 functions as a job receipt unit which receives a job. Upon receiving a job, the service execution unit 38 assigns an ID to the job, and after assigning the ID, the units 36, 37 and 38 can identify the job by the ID.

In FIG. 2, the storage device 17 is a non-volatile storage device such as hard disk drive or flush memory, and forms one or more document boxes 17*a*. In the document box 17*a*, one or more document data files can be stored. For example, the image forming apparatus 1 is capable of executing a job of printing a document based on a document data file in the document box 17*a*.

Figure 3:
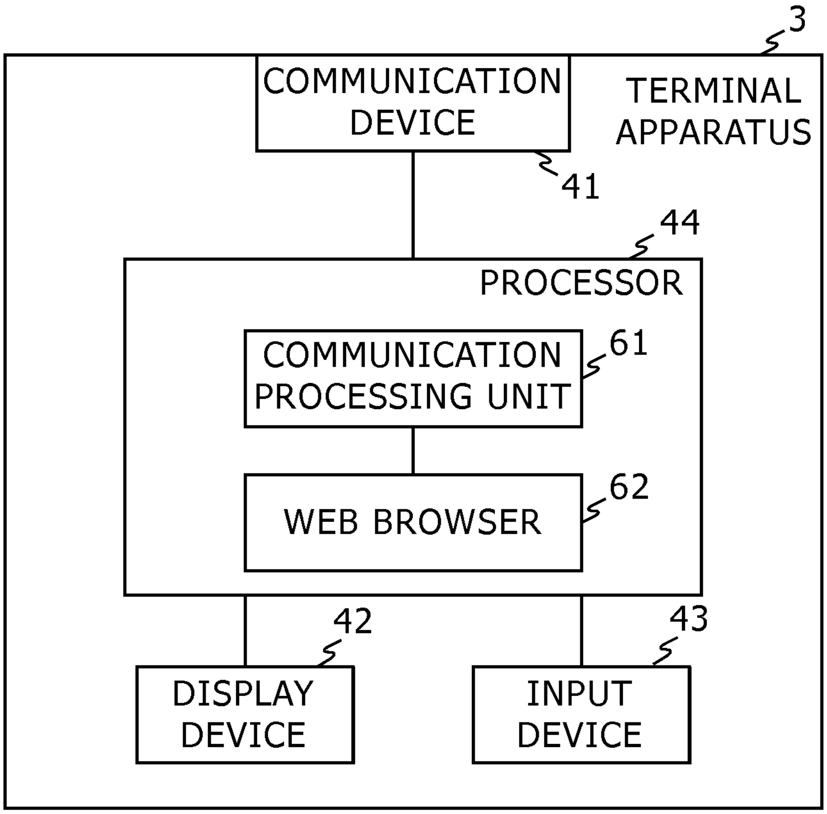
FIG. 3 shows a block diagram that indicates a configuration of the terminal apparatus in FIG. 1.

FIG. 3 shows a block diagram that indicates a configuration of the terminal apparatus 3 in FIG. 1. The terminal apparatus 3 is, for instance, a personal computer having network function in which programs such as an operating system and a web browser has been installed.

The terminal apparatus 3 has a communication device 41, a display device 42, an input device 43, and a processor 44.

The communication device 41 is connected to the network 2, and performs data communication with other devices (e.g. the image forming apparatus 1) via the network 2 according to a predetermined communication protocol. For example, the communication device 41 is a network interface or a modem.

The display device 42 such as liquid crystal display displays information to a user of the terminal apparatus 3. The input device 43 such as keyboard or mouse receives user operation.

The processor 44 is a computer which has a CPU, a ROM, and a RAM, and loads programs into the RAM from the ROM or an unshown memory device and executes the programs by the CPU to form some processing units.

After the terminal apparatus 3 starts, the processor 44 executes some programs as necessary. In this embodiment, the processor 44 forms processing units which include an unshown operating system, a communication processing unit 61, and a web browser 62.

The communication processing unit 61 is a processing unit which performs data communication by controlling the communication device 41. The web browser 62 is a processing unit which obtains page data (here, an HTML file) from the web server according to HTTP by using the communication processing unit 61, and causes the display device 42 to display a screen based on the page data.

In the following part, operations of the apparatuses 1 and 3 in this system are explained.

Figure 4:
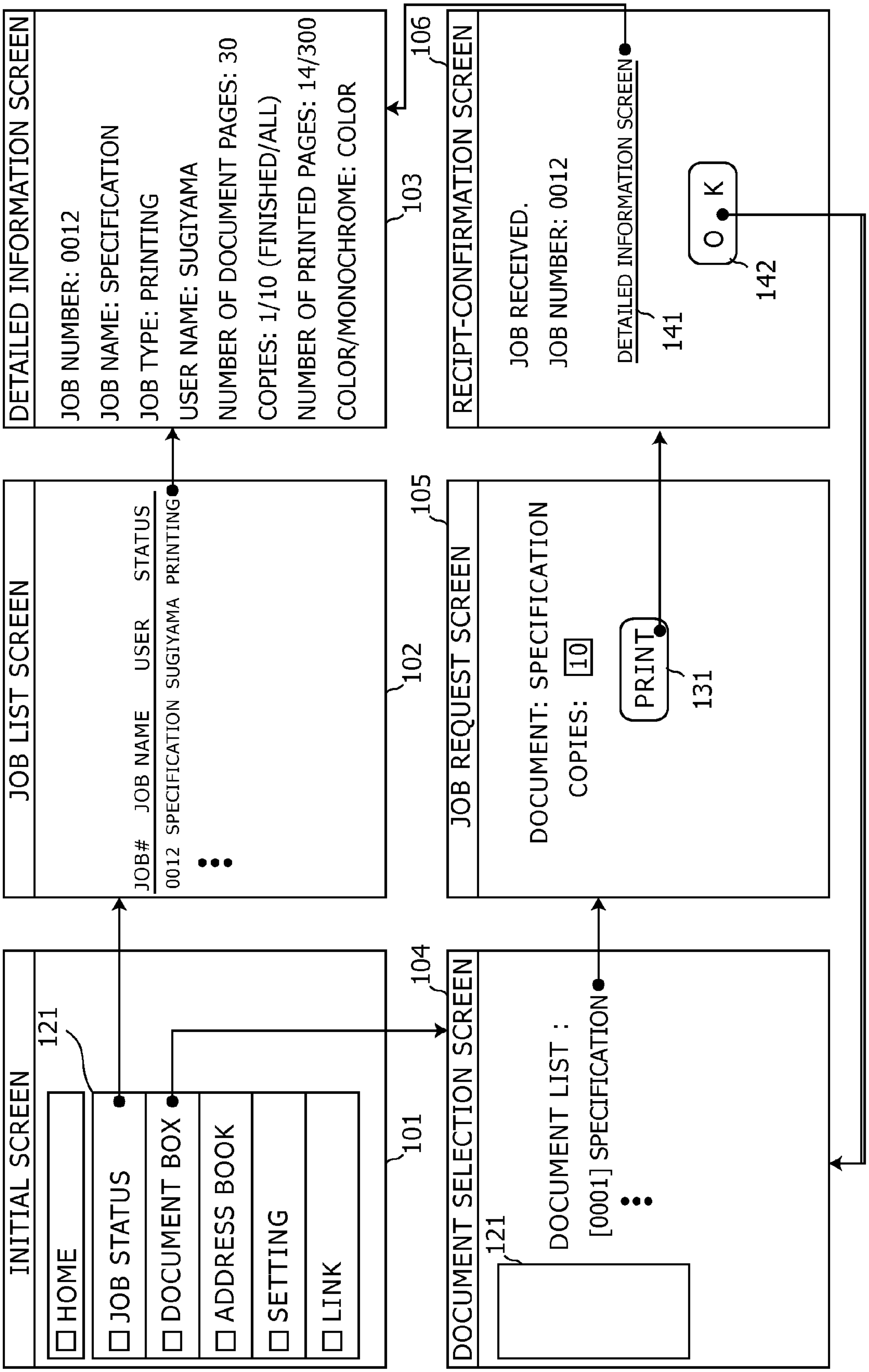
FIG. 4 shows a diagram that explains screen transitions in a web browser of the terminal apparatus in FIG. 1.

FIG. 4 shows a diagram that explains screen transitions in the web browser 62 of the terminal apparatus 3 in FIG. 1.

If a URL of the image forming apparatus 1 is chosen by a user, then the web browser 62 of the terminal apparatus 3 transmits a transmission request of page data of an initial screen according to HTTP by using the communication processing unit 61 and the communication device 41.

In the image forming apparatus 1, the web server of the communication processing unit 32 receives the transmission request via the network 2 by using the communication device 15, and upon receipt of this request, the web server management unit 37 generates the page data of the initial screen specified in the transmission request and transmits the page data to the web browser 62. For example, as shown in FIG. 4, the web server management unit 37 generates page data of an initial screen 101 which includes a menu 121. Each of items in the menu 121 has a link to page data of a screen. Upon receiving the page data of the initial screen 101, the web browser 62 causes the display device 42 to display the initial screen 101.

To display detailed information on a current status of a job by starting from the initial screen 101, the user firstly chooses a link to a job list screen 102 in the menu 121 (i.e. the item "JOB STATUS" in the menu 121). According to this user operation, the web browser 62 transmits a transmission request of page data to a URL included in the chosen link (i.e. in the chosen item). This page data is page data of the job list screen 102 shown in FIG. 4. In the image forming apparatus 1, the web server of the communication processing unit 32 receives this transmission request, and upon receipt of the request, the web server management unit 37 generates the page data and transmits the page data to the web browser 62. This page data includes a list of one or more current jobs (either one or more uncompleted jobs or one or more completed and uncompleted jobs) determined by the status management unit 36. Upon receiving the page data, the web browser 62 causes the display device 42 to display the job list screen 102 based on the received page data. In the job list screen 102, the user chooses a link to page data of a job detailed-information screen 103 on a job which the user wants to see detailed information on. According to this user operation, the web browser 62 transmits a transmission request of page data to a URL included in the chosen link (i.e. in the chosen item). This page data is page data of the job detailed-information screen 103 shown in FIG. 4. In the image forming apparatus 1, the web server of the communication processing unit 32 receives this transmission request, and upon receipt of the request, the web server management unit 37 generates the page data and transmits the page data to the web browser 62. This page data includes detailed information on a current job status of the job specified in the request. The current job status is determined by the status management unit 36. Upon receiving the page data, the web browser 62 causes the display device 42 to display the job detailed-information screen 103 based on the received page data.

Therefore, to display detailed information on a current status of a job by starting from the initial screen 101, the user firstly makes the job list screen 102 displayed, and secondly chooses a job in the job list to display a detailed information screen 103 of the job.

Figure 5A:
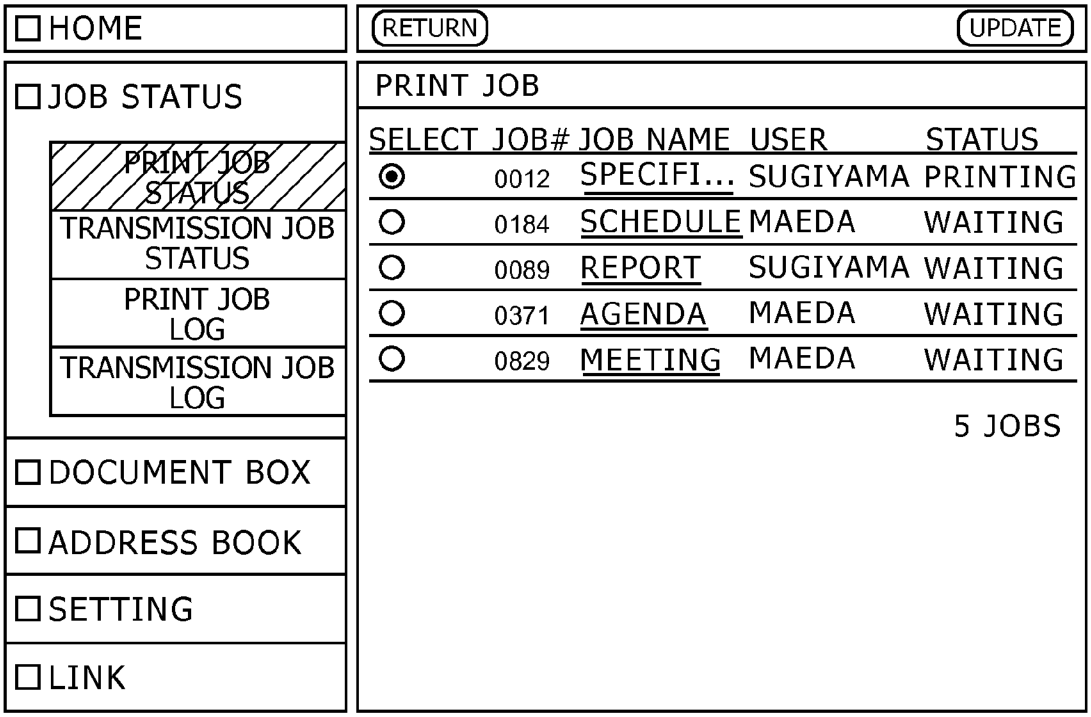
FIGS. 5A and 5B show diagrams that indicate an instance of a job list screen and an instance of a job detailed-information screen.
Figure 5B:
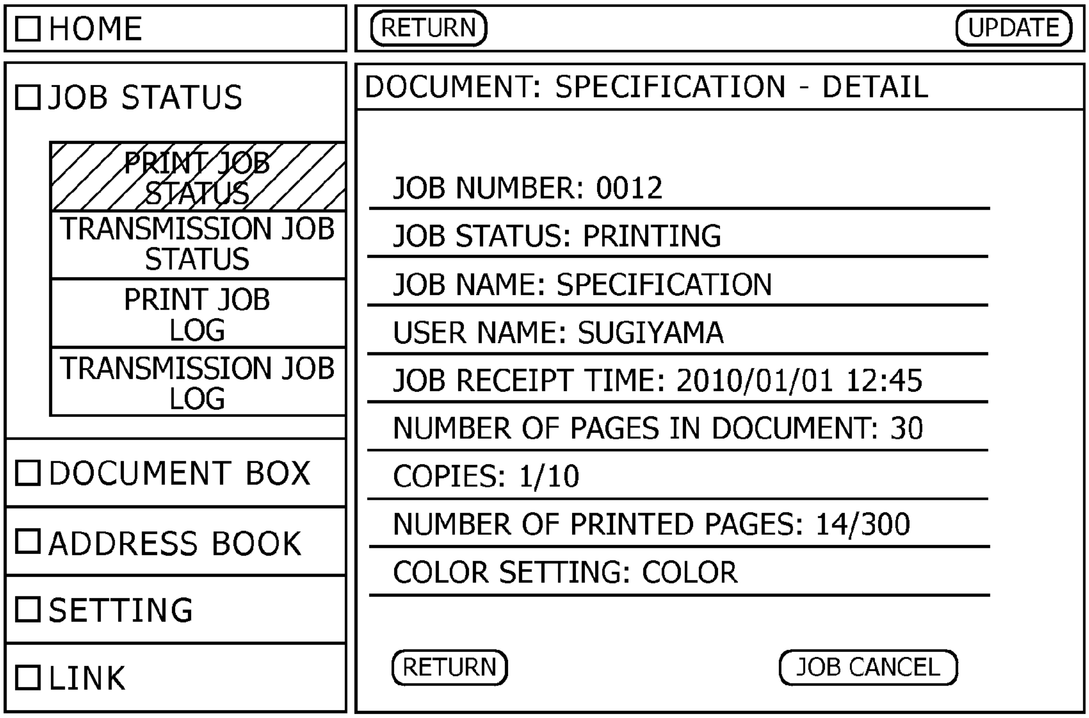

FIGS. 5A and 5B show diagrams that indicate an instance of a job list screen and an instance of a job detailed-information screen. FIG. 5A shows an instance of a job list screen and FIG. 5B shows an instance of a job detailed-information screen. In the job list shown in FIG. 5A, a job name of each job has a link to a detailed information screen on the job. In the job detailed-information screen shown in FIG. 5B, the detailed information is displayed such as an execution status of the job (executing, e.g. printing, waiting, etc.), and execution progress (the number of printed pages, etc.) of the job if the job is being executed.

If the user wants to print a document based on a document data file in the document box 17*a*, for example, then the user clicks the item "DOCUMENT BOX" in the menu 121 by operating the input device 43. According to this user operation, the web browser 62 transmits a transmission request of page data to a URL included in the chosen link (i.e. in the chosen item). This page data is page data of a document selection screen 104 shown in FIG. 4. In the image forming apparatus 1, the web server of the communication processing unit 32 receives this transmission request, and upon receipt of the request, the web server management unit 37 generates the page data and transmits the page data to the web browser 62. This page data includes a list of one or more document data files in the document box 17*a*. Upon receiving the page data, the web browser 62 causes the display device 42 to display the document selection screen 104.

In the document selection screen 104, the user chooses a document data file and clicks an item of the file in the list (e.g. "SPECIFICATION" in FIG. 4) for which a job request will be generated. This means to choose a link to page data of a job request screen 105 used for generating the job request of the chosen document data file. According to this user operation, the web browser 62 transmits a transmission request of page data to a URL included in the chosen link. This page data is page data of the job request screen 105 shown in FIG. 4. In the image forming apparatus 1, the web server of the communication processing unit 32 receives this transmission request, and upon receipt of the request, the web server management unit 37 generates the page data of the job request screen 105 for the chosen document and transmits the page data to the web browser 62. Upon receiving the page data, the web browser 62 causes the display device 42 to display the job request screen 105 based on the received page data.

In the job request screen 105, the user inputs print settings such as the number of copies to be printed, and pushes PRINT button 131 by using the input device 43. According to this user operation, the web browser 62 transmits a job request to a URL assigned to PRINT button 131. For example, this job request is an HTTP command with one or more parameters of the print settings.

In the image forming apparatus 1, the web server of the communication processing unit 32 receives this job request, and upon receipt of the request, the service execution unit 38 causes the job control unit 34 to execute a job specified by the job request, and the web server management unit 37 generates the page data of a job receipt-confirmation screen 106 and transmits the page data to the web browser 62. The job receipt-confirmation screen 106 indicates that the job request has been received. Upon receiving the page data, the web browser 62 causes the display device 42 to display the job receipt-confirmation screen 106 based on the received page data. The web server management unit 37 inserts a link to the page data of the job detailed-information screen 103 of the job specified by the job request into the page data of the job receipt-confirmation screen 106. Consequently, as shown in FIG. 4, in the job receipt-confirmation screen 106, a link 141 to the job detailed-information screen 103 of the specified job is displayed.

If the user wants to see the job detailed-information screen 103 of the specified job, then in the job receipt-confirmation screen 106 the user clicks the link 141 to the job detailed-information screen 103 by using the input device 43. According to this user operation, the web browser 62 transmits a transmission request of page data to a URL included in the chosen link. This page data is page data of the job detailed-information screen 103 shown in FIG. 4. In the image forming apparatus 1, the web server of the communication processing unit 32 receives this transmission request, and upon receipt of the request, the server management unit 37 generates the page data and transmits the page data to the web browser 62. This page data includes detailed information on a current job status of the job received by the service execution unit 38. Upon receiving the page data, the web browser 62 causes the display device 42 to display the job detailed-information screen 103 based on the received page data. Otherwise, in the job receipt-confirmation screen 106, if the user does not need to display the job detailed-information screen 103 of this job, then the user pushes OK button 142 by using the input device 43. According to this user operation, the web browser 62 turns off the job receipt-confirmation screen 106, and causes to display the document selection screen 104 again.

Therefore, after requesting a job, the job receipt-confirmation screen 106 is automatically displayed, and one user operation in the job receipt-confirmation screen 106 can cause to immediately display the job detailed-information screen 103 of this job. Consequently, a lot of user operations (e.g. starting from the menu 121, choosing the job list screen 102 in the menu 121, and choosing the job in the screen 102) are not required to display the job detailed-information screen 103 of this job.

Figure 6A:
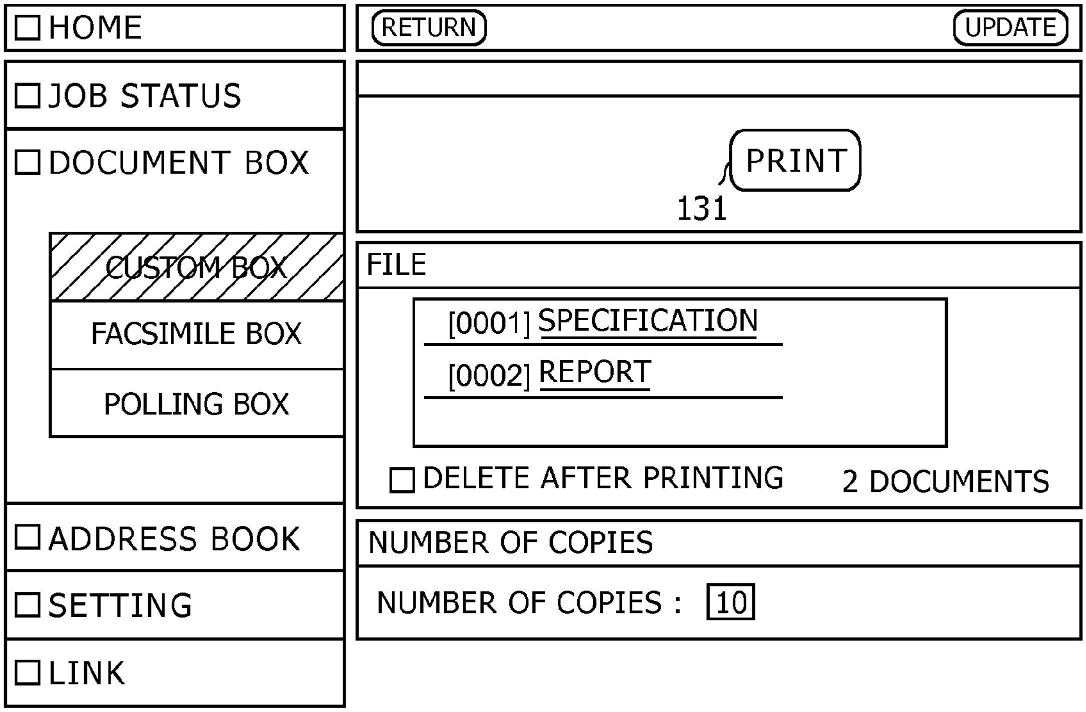
FIGS. 6A and 6B show diagrams that indicate an instance of a job request screen and an instance of a job receipt-confirmation screen.
Figure 6B:
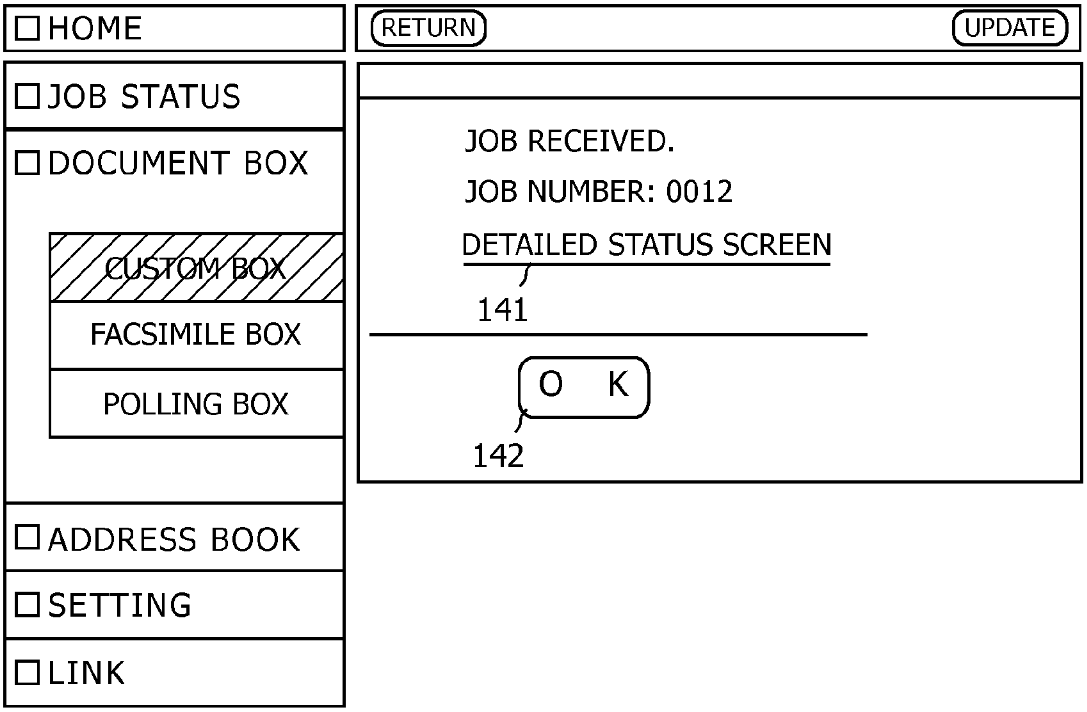

FIGS. 6A and 6B show diagrams that indicate an instance of a job request screen and an instance of a job receipt-confirmation screen. FIG. 6A shows an instance of a job request screen and FIG. 6B shows an instance of a job receipt-confirmation screen. The screen shown in FIG. 6A includes a document selection screen and a job request screen. Therefore, in the screen shown in FIG. 6A, user operations are performed for choosing a document data file and for requesting a job. In FIG. 6A, a list of a plural of the document boxes 17*a* is displayed, and if one of the document boxes 17*a* is chosen by the user, then a list of one or more document data files in the chosen document box 17*a* is displayed.

According to the aforementioned embodiment, the terminal apparatus 3 has the web browser 62 which causes the display device 42 to display a screen based on page data; and the image forming apparatus 1 has (a) the communication processing unit 32 transmits the page data corresponding to a request received from the web browser, (b) the service execution unit 38 that receives a job, (c) the status management unit 36 that determines a status of the job, and (d) the web server management unit 37 that generates page data of a job list screen 102 corresponding to a request received from the web browser 62 and transmits the page data of the job list screen to the web browser 62 by using the web server. This job list screen includes a link to page data of a detailed information screen on an uncompleted job. The detailed information screen is a screen that displays the status of one job determined by the status management unit 36. In addition, the web server management unit 37 generates page data of a job request screen 105 corresponding to a request received from the web browser 62 and transmits the page data of the job request screen 105 to the web browser 62 by using the web server; and if the service execution unit 38 receives a job requested based on the page data of the job request screen 105, then the web server management unit 37 generates page data of a receipt-confirmation screen 106 on the received job and transmits the page data of the receipt-confirmation screen 106 to the web browser 62 by using the web server. The page data of the receipt-confirmation screen 106 includes to a link to page data of a detailed information screen 103 on the received job.

Therefore, with one user operation, the user can make the detailed information screen 103 immediately displayed after the job receipt by following the link to the detailed information screen 103 in the receipt-confirmation screen 106. Therefore, detailed information on a status of a job is displayed with simple user operation after the user requests the job.

The description of the present invention has been presented for purposes of illustration and description, and is not intended to be exhaustive or limited to the invention in the form disclosed. Many modifications and variations will be apparent to those of ordinary skill in the art.

For example, in the aforementioned embodiment, the web browser 62 of the terminal apparatus 3 causes to display screens based on page data. Alternatively, the image forming apparatus 1 may have a web browser which causes the display device in the operation panel 14 to display the same screens.

Further, in the aforementioned embodiment, a URL of page data of the detailed information screen 103 included in a link to the detailed information screen 103 may have a parameter which indicates a job ID (e.g. job number), and the web server management unit 37 may generate page data of the detailed information screen 103 on a job determined from the job ID in a transmission request of the page data.

Furthermore, in the aforementioned embodiment, the receipt-confirmation screen 106 includes a link to page data of the detailed information screen 103. Alternatively, the receipt-confirmation screen 106 may include a link to page data of the job list screen 102. If the receipt-confirmation screen 106 includes a link to page data of the job list screen 102, a job list in the job list screen 102 includes a job requested in the job request screen 105. Therefore, in this case, the user can make the job list displayed by following the link to the job list screen 102 in the receipt-confirmation screen 106, and make the detailed information screen 103 of a job displayed after receiving the job by choosing the requested job from the job list. Therefore, detailed information on a status of a job is displayed with simple user operation after the user requests the job.

What is claimed is:

1. An image forming system, comprising:

an image forming apparatus configured to connect to a network; and a terminal apparatus configured to connect to the network;

wherein the terminal apparatus comprises a web browser that causes a display device to display a screen based on page data; and the image forming apparatus comprises:

(a) a web server configured to transmit the page data corresponding to a request received from the web browser, (b) a job receipt unit configured to receive a job, (c) a job status management unit configured to determine a status of the job, and (d) a page data generation unit configured to (a) generate the page data of an initial screen that includes a link to the page data of a job list screen and a link to the page data of a document selection screen in a document box, wherein the page data of the job list screen includes a list of one or more current jobs determined by the job status management unit, and the page data of the document selection screen includes one or more documents based on document data, wherein the page data of the job list screen includes a link to the page data of a detailed information screen on an uncompleted job and (b) transmit the page data of the job list screen to the web browser by using the web server;

wherein the detailed information screen is a screen that displays the status of the job determined by the job status management unit;

wherein the page data generation unit is further configured to (A) generate the page data of a job request screen corresponding to a request on the document selection screen received from the web browser and transmit the page data of the job request screen to the web browser by using the web server, and (B) if the job receipt unit receives a job that is requested based on the page data of the job request screen, generate page data of a receipt-confirmation screen on the received job and transmit the page data of the receipt-confirmation screen that includes a link to page data of the detailed information screen on the received job and a link to the page data of the job list screen, to the web browser by using the web server;

wherein the receipt-confirmation screen, including said link to page data of the detailed information screen, is automatically displayed after requesting the job, whereby a user at the terminal apparatus can display the detailed information screen by directly using said link; and wherein said receipt confirmation screen not including a listing of other jobs.

2. An image forming apparatus that connects to a network, comprising:

(a) a job receipt unit configured to receive a job;

(b) a job status management unit configured to determine a status of the job; and (c) a page data generation unit configured to generate page data of an initial screen that includes a link to the page data of a job list screen and a link to the page data of a document selection screen in a document box, wherein the page data of the job list screen includes a list of one or more current jobs determined by the job status management unit, and the page data of the document selection screen includes one or more documents based on document data, wherein the page data of the job list screen includes a link to the page data of a detailed information screen on an uncompleted job; wherein the detailed information screen is a screen that displays the status of the job determined by the job status management unit; and the page data generation unit is further configured to (A) generate the page data of a job request screen corresponding to a request on the document selection screen, and (B) if the job receipt unit receives a job that is requested based on the page data of the job request screen, generate the page data of a receipt-confirmation screen that includes a link to the page data of the detailed information screen on the received job and a link to the page data of the job list screen; wherein the receipt-confirmation screen, including said link to page data of the detailed information screen, is automatically displayed after requesting the job, whereby the user can display the detailed information screen by directly using said link; wherein said receipt confirmation screen does not include a listing of other jobs.

3. The image forming apparatus that connects to the network according to claim 2, further comprising:

a web server configured to transmit the page data corresponding to a request received from a web browser of a terminal apparatus that is configured to connect to the network;

wherein the page data generation unit is further configured to (A) generate the page data of the job request screen corresponding to the request that is received from the web browser and transmit the page data of the job request screen to the web browser by using the web server, and (B) if the job receipt unit receives the job that is requested based on the page data of the job request screen, generate the page data of the receipt-confirmation screen on the received job and transmit the page data of the receipt-confirmation screen that includes the link to the page data of the detailed information screen on the received job, to the web browser by using the web server.

4. The image forming apparatus that connects to the network according to claim 3, wherein:

the link to the page data of the detailed information screen includes a URL of the page data of the detailed information screen for the received job, and the URL is assigned when the job is received.

5. The image forming apparatus that connects to the network according to claim 3, wherein:

the page data are described in HTML.

6. An image forming apparatus that connects to a network, comprising:

(a) a job receipt unit configured to receive a job;

(b) a job status management unit configured to determine a status of the job; and (c) a page data generation unit configured to generate the page data of an initial screen that includes a link to the page data of a job list screen and a link to the page data of a document selection screen in a document box, wherein the page data of the job list screen includes a list of one or more current jobs determined by the job status management unit, and the page data of the document selection screen includes one or more documents based on document data, wherein the page data of the job list screen includes a link to the page data of an uncompleted-job list screen that includes a link to the page data of a detailed information screen on an uncompleted job; wherein the detailed information screen is a screen that displays the status of the job determined by the job status management unit; and the page data generation unit is further configured to (A) generate the page data of a job request screen corresponding to a request on the document selection screen, and (B) if the job receipt unit receives a job requested based on the page data of the job request screen, generate the page data of a receipt-confirmation screen that includes a link to the page data of the uncompleted-job list screen; wherein the receipt-confirmation screen, including said link to page data of the detailed information screen, is automatically displayed after requesting the job, whereby the user can display the detailed information screen by directly using said link; wherein said receipt confirmation screen does not include a listing of other jobs.

7. The image forming apparatus that connects to the network according to claim 6, further comprising:

a web server configured to transmit the page data corresponding to a request received from a web browser of a terminal apparatus that is configured to connect to the network;

wherein the page data generation unit is further configured to (A) generate the page data of the job request screen corresponding to the request received from the web browser and transmit the page data of the job request screen to the web browser by using the web server, and (B) if the job receipt unit receives the job requested based on the page data of the job request screen, generate the page data of the receipt-confirmation screen on the received job and transmit the page data of the receipt-confirmation screen that includes the link to the page data of the uncompleted-job list screen, to the web browser by using the web server.

8. The image forming apparatus that connects to the network according to claim 7, wherein:

the link to the page data of the detailed information screen includes a URL of the page data of the uncompleted-job list screen for the received job, and the URL is assigned when the job is received.

9. The image forming apparatus that connects to the network according to claim 7, wherein:

the page data are described in HTML.

* * * * *